United States Patent
Kang

(10) Patent No.: US 9,387,799 B2
(45) Date of Patent: Jul. 12, 2016

(54) SAFETY SIGN BOARD SYSTEM FOR AUTOMOBILE

(71) Applicant: Su Il Kang, Chungcheongnam-do (KR)

(72) Inventor: Su Il Kang, Chungcheongnam-do (KR)

(*) Notice: Subject to any disclaimer, the term of this patent is extended or adjusted under 35 U.S.C. 154(b) by 0 days.

(21) Appl. No.: 14/819,414

(22) Filed: Aug. 5, 2015

(65) Prior Publication Data

US 2016/0152176 A1    Jun. 2, 2016

(30) Foreign Application Priority Data

Dec. 1, 2014    (KR) ................. 10-2014-0170016

(51) Int. Cl.
*B60Q 1/46*    (2006.01)
*B60Q 1/26*    (2006.01)

(52) U.S. Cl.
CPC ............... *B60Q 1/46* (2013.01); *B60Q 1/2615* (2013.01)

(58) Field of Classification Search
CPC ............ B60Q 1/46; B60Q 7/00; B60Q 7/005; B60Q 7/02
See application file for complete search history.

(56) References Cited

U.S. PATENT DOCUMENTS

2007/0011928 A1* 1/2007 Wang ..................... B60Q 7/00
                                                                    40/612

* cited by examiner

*Primary Examiner* — Curtis Odom
(74) *Attorney, Agent, or Firm* — KORUS Patent, LLC; Seong Il Jeong

(57) ABSTRACT

According to an embodiment of the present disclosure, a safety sign board system attached to an inner surface of a trunk lid of an automobile comprises an upper case 20 having a space for receiving a safety sign board and attached to the inner surface of the trunk lid of the automobile, a support coupled with a front portion of the upper case via a hinge, and the safety sign board shaped as a triangle, having an upper plate and a lower plate attached to each other, and attached to the support via a bolt. A plurality of light emitting diodes (LEDs) or lamps are formed on a surface of the upper plate.

4 Claims, 5 Drawing Sheets

SAFETY SIGN BOARD SYSTEM FOR AUTOMOBILE

CROSS-REFERENCE TO RELATED APPLICATIONS

This patent application claims priority under 35 U.S.C. §119 to Korean Patent Application No. 10-2014-0170016, filed on Dec. 1 2014, in the Korean Intellectual Property Office, the disclosure of which is incorporated by reference herein in its entirety.

TECHNICAL FIELD

The present disclosure relates to a safety sign board system, and more specifically, to a safety sign board system that is easy to use and may alert other drivers to an accident using a laser.

DISCUSSION OF RELATED ART

Generally, safety sign boards may be used to alert other drivers to an accident. A safety sign board is left to stand by an "A"-shaped support on the road. Such conventional-type safety sign board is quite uncomfortable and annoying in use and takes time to put in use on the road.

SUMMARY

According to an embodiment of the present disclosure, a safety sign board system attached to an inner surface of a trunk lid of an automobile comprises an upper case 20 having a space for receiving a safety sign board and attached to the inner surface of the trunk lid of the automobile, a support coupled with a front portion of the upper case via a hinge, and the safety sign board shaped as a triangle, having an upper plate and a lower plate attached to each other, and attached to the support via a bolt. A plurality of light emitting diodes (LEDs) or lamps are formed on a surface of the upper plate. A laser is formed on each edge or a side on the surface of the upper plate. A hinge is formed at a middle portion on a rear surface of the safety sign board to fold the safety sign board at the middle portion. A connection line is connected to the rear surface of the safety sign board. The safety sign board system comprises a lower cover coupled to a rear side of the upper case via a hinge.

The laser may include an inner bearing for adjusting an angle at a lower portion thereof.

A plurality of magnets may be detachably formed on an upper surface of the upper case.

A mark indicating a dangerous situation may be formed on a front lens of the laser, so that the mark may be displayed on a road.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Hereinafter, exemplary embodiments of the inventive concept will be described in detail with reference to the accompanying drawings. The same reference denotations may be used to refer to the same or similar elements throughout the specification and the drawings. The inventive concept, however, may be modified in various different ways, and should not be construed as limited to the embodiments set forth herein. As used herein, the singular forms "a," "an," and "the" are intended to include the plural forms as well, unless the context clearly indicates otherwise. It will be understood that when an element or layer is referred to as being "on" "connected to," "coupled to," or "adjacent to" another element or layer it can be directly on, connected, coupled, or adjacent to the other element or layer, or intervening elements or layers may be present.

Figure 1:
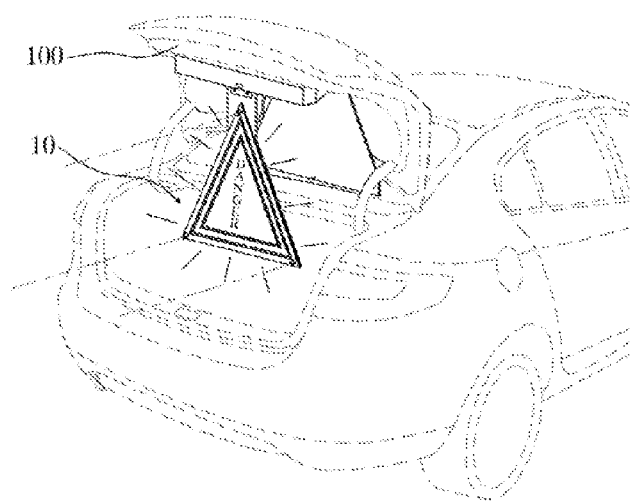
FIG. 1 is a perspective view illustrating a safety sign board according to an embodiment of the is present disclosure.
Figure 2:
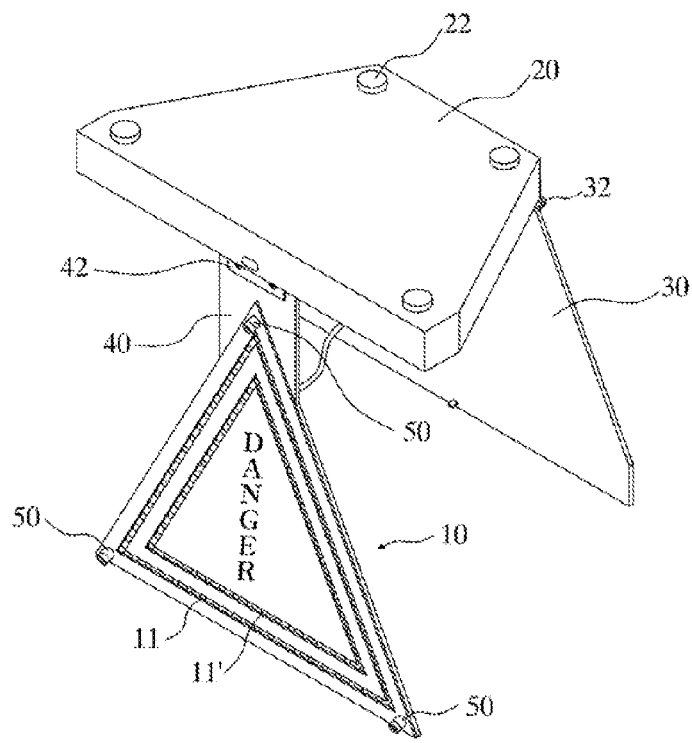
FIG. 2 is an exploded perspective view illustrating a safety sign board according to an embodiment of the present disclosure.
Figure 3:
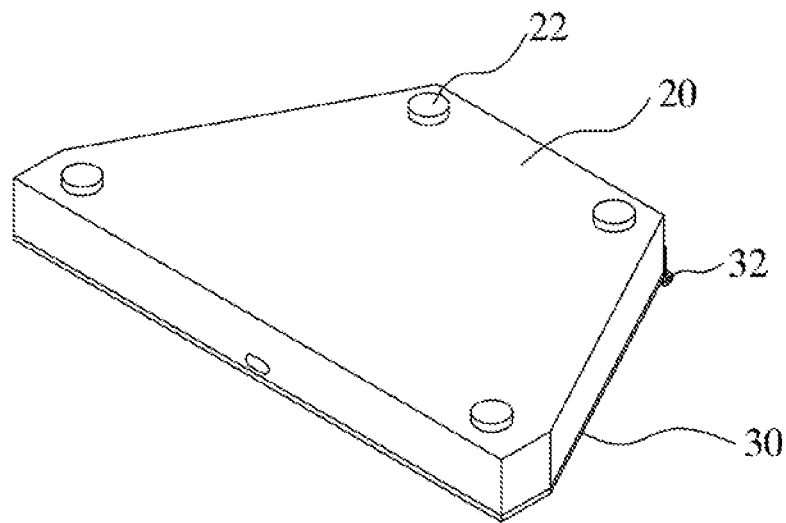
FIG. 3 is a perspective view illustrating a safety sign board according to an embodiment of the present disclosure.
Figure 4:
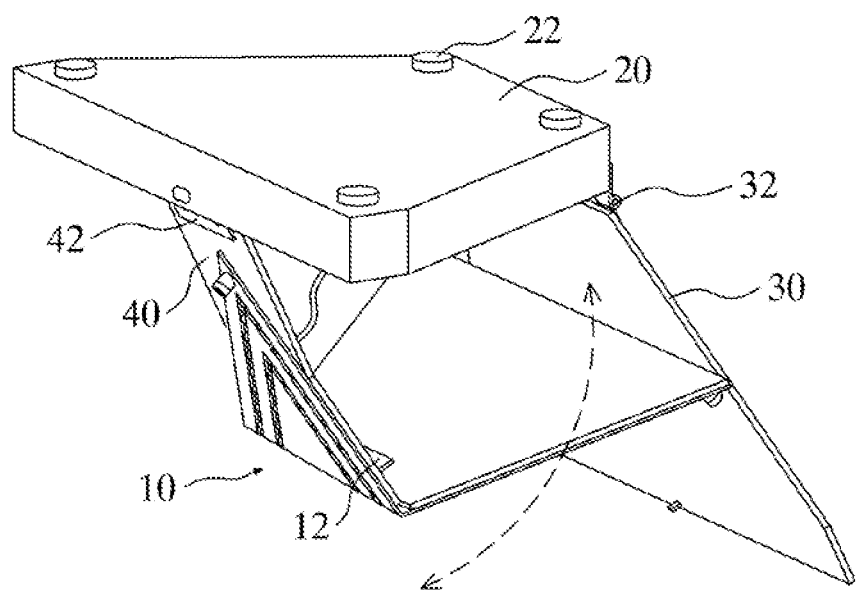
FIG. 4 is an exploded perspective view illustrating, a safety sign board according to an embodiment of the present disclosure.
Figure 5:
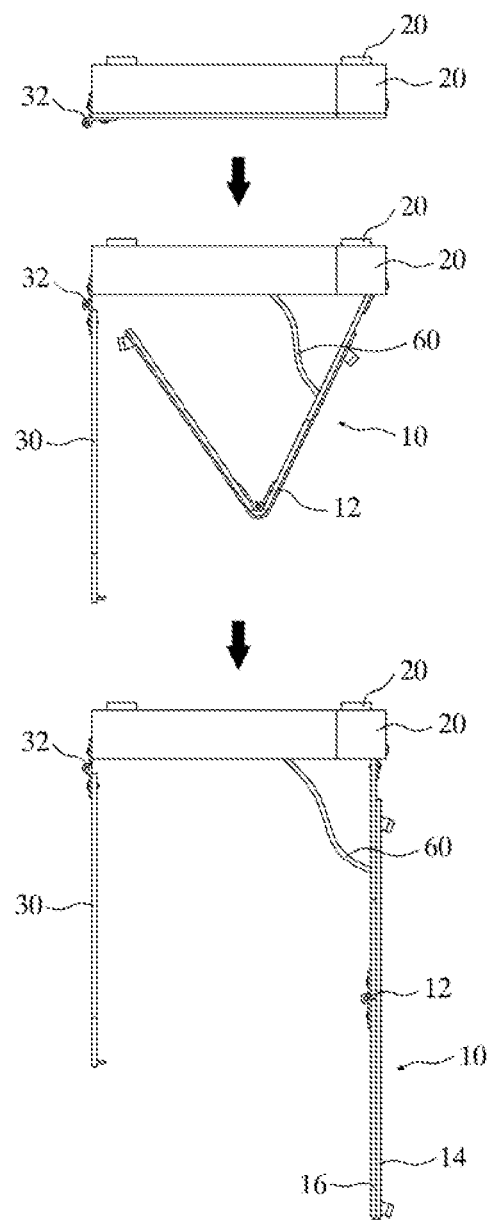
FIG. 5 is an exploded cross-sectional view illustrating a safety sign board according to an embodiment of the present disclosure.
Figure 6:
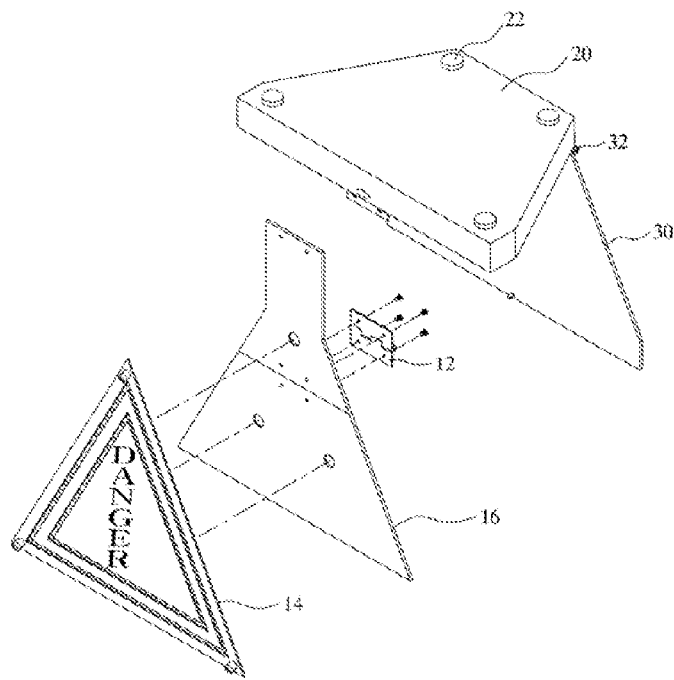
FIG. 6 is an exploded perspective view illustrating a safety sign board according to an embodiment of the present disclosure.
Figure 7:
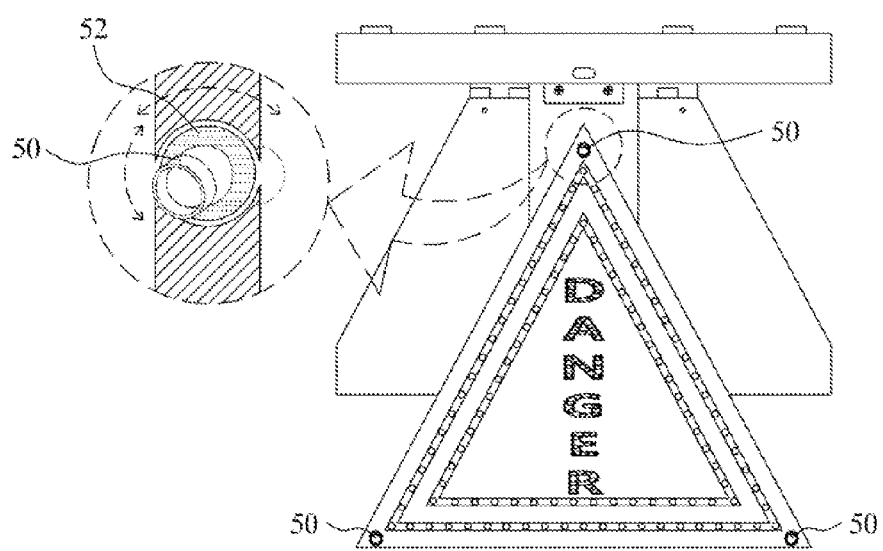
FIG. 7 is an exploded perspective view illustrating a safety sign board according to an embodiment of the present disclosure.
Figure 8:
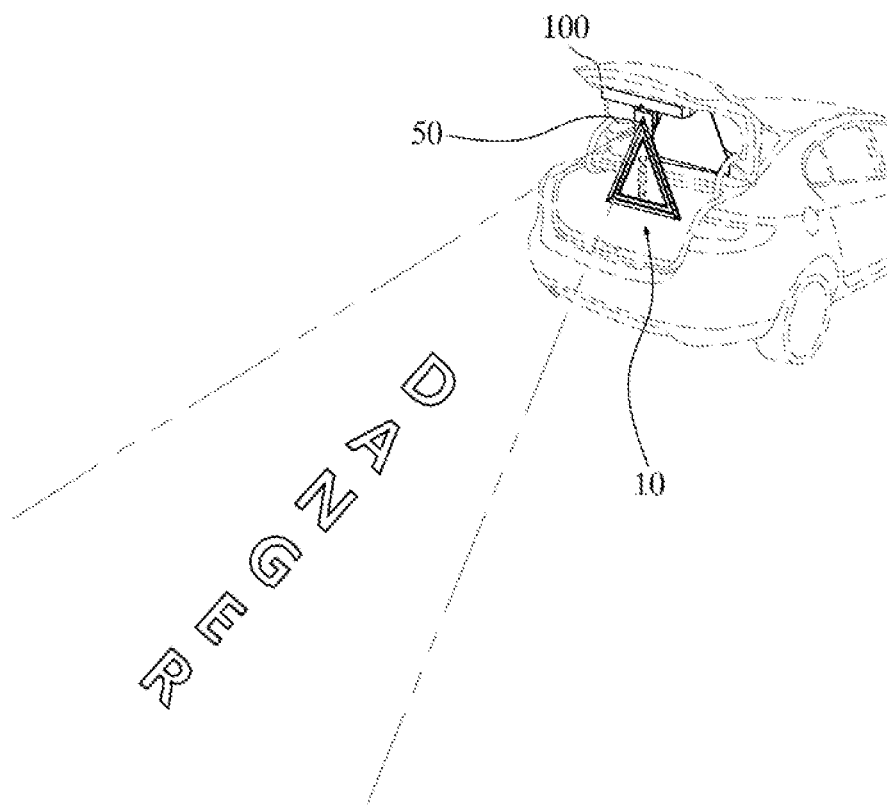
FIG. 8 is a perspective view illustrating a safety sign board according to an embodiment of the present disclosure.

FIG. 1 is a perspective view illustrating a safety sign hoard according to an embodiment of the present disclosure. FIG. 2 is an exploded perspective view illustrating a safety sign board according to an embodiment of the present disclosure. FIG. 3 is a perspective view illustrating a safety sign board according to an embodiment of the present disclosure. FIG. 4 is an exploded perspective view illustrating a safety sign board according to an embodiment of the present disclosure. FIG. 5 is an exploded cross-sectional view illustrating a safety sign board according to an embodiment of the present disclosure. FIG. 6 is an exploded perspective view illustrating a safety sign board according to an embodiment of the present disclosure. FIG. 7 is an exploded perspective view illustrating a safety sign board according to an embodiment of the present disclosure. FIG. 8 is a perspective view illustrating a safety sign board according to an embodiment of the present disclosure.

According to an embodiment of the present disclosure, a safety sign board system attached to an inner surface of a trunk lid 100 of an automobile comprises an upper case 20 having a space for receiving a safety sign board 10 and attached to the inner surface of the trunk lid of the automobile, a support coupled with a front portion of the upper case 20 via a hinge 42, and the safety sign board 10 shaped as a triangle, having an upper plate 14 and a lower plate 16 attached to each other, and attached to the support via a bolt. A plurality of light emitting diodes (LEDs) 11 and 11' or lamps are formed on a surface of the upper plate 14. A laser 50 is formed on each edge or a side on the surface of the upper plate 14. A hinge 12 is formed at a middle portion on a rear surface of the safety sign board 10 to fold the safety sign board 10 at the middle portion. A connection line 60 is connected to the rear surface of the safety sign board 10. The safety sign hoard system comprises a lower cover 30 coupled to a rear side of the upper case 20 via a hinge 32.

The LEDs 11 and 11' may emit light to alert other drivers of the accident.

The laser may include an inner bearing 52 for adjusting an angle at a lower portion thereof.

A plurality of magnets 22 may be detachably formed on an upper surface of the upper case 20.

A mark indicating a dangerous situation may be formed on a front lens of the laser, so that the mark may be displayed on a road.

When a car accident occurs, the driver may pull over the car to a safe area, open the trunk lid 100 and attach the magnets 22 formed on the upper case 20 to the inner surface of the trunk lid 100 to open the safety sign board 10. As such, the safety sign board 10 is opened and positioned in place to alert other drivers. After the accident is treated, the driver may fold back and retain the safety sign board 10 in the trunk.

As shown in FIGS. 1 to 8, the upper case 20 has a space to retain the safety sign board 10. The plurality of magnets 22 are attached onto the upper surface of the upper case 20 to be attached to the inner surface of the trunk lid 100. The support 40 is connected with the front portion of the upper case 20 via the hinge 42.

As shown in FIGS. 1 to 8, the safety sign board 10 includes the upper plate 14 and the lower plate 16 attached to each other. The plurality of LEDs 11 and 11' are formed on the surface of the upper plate 14. Lasers 50 ma be formed on their respective corresponding corners or edges on the surface of the upper plate 14. The safety sign board 10 may be attached to the support 40 via a bolt. The hinge 12 may be formed at a middle portion on the rear surface of the safety sign board 10. The safety sign board 10 may be folded at the middle portion. The lower cover 30 may be connected to a rear side of the upper case 20 via the hinge 32. The connection line 60 is formed on the rear surface of the safety sign board 10.

As shown in FIGS. 7 and 8, each laser 50 includes the inner bearing 52 to adjust the angle of the laser 50, e.g., in an upper or lower direction, to show the situation of the accident to other drivers.

The front lens included in the laser 50 may have a mark indicating the dangerous situation of the accident, e.g., a mark saying "DANGER!!" Accordingly, when the laser 50 emits a laser beam to the road, the mark, e.g., "DANGER!" may be displayed on the road, alerting other drivers.

The laser beam may travel a long distance on the road, thus enabling other drivers far away from the accident site to be known of the occurrence of the accident. Thus, the likelihood of secondary accidents may be reduced.

According to embodiments of the present disclosure, the safety sign hoard 10 may be retained in the space of the upper case 20, and may be easily folded out to be readily in use by opening the upper and lower cases 20 and 30. Further, while not in use, the safety sign hoard 10 may he retained in the cases 20 and 30 in an organized manner. Further, co-use of the LEDs 11 and 11' and the angle-adjustable laser 50 may allow for alerting other drivers far away from the accident site, thus contributing to prevention of possible secondary accidents by other drivers.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A safety sign board system attached to an inner surface of a trunk lid of an automobile, the safety sign board system comprising:
   an upper case having a space for receiving a safety sign board and attached to the inner surface of the trunk lid of the automobile;
   a support coupled with a front portion of the upper case via a hinge;
   the safety sign board shaped as a triangle, having an upper plate and a lower plate attached to each other, and attached to the support via a bolt, wherein a plurality of light emitting diodes (LEDs) or lamps are formed on a surface of the upper plate, wherein a laser is formed on each edge or a side on the surface of the upper plate, wherein a hinge is formed at a middle portion on a rear surface of the safety sign board to fold the safety sign board at the middle portion, and wherein a connection line is connected to the rear surface of the safety sign board; and
   a lower cover coupled to a rear side of the upper case via a hinge.

2. The safety sign board system of claim 1, wherein the laser includes an inner bearing for adjusting an angle at a lower portion thereof.

3. The safety sign board system of claim 1, wherein a plurality of magnets are detachably formed on an upper surface of the upper case.

4. The safety sign board system of claim 1, wherein a mark indicating a dangerous situation is formed on a front lens of the laser, so that the mark may be displayed on a road.

* * * * *